US006224445B1

(12) United States Patent
Neukermans et al.

(10) Patent No.: US 6,224,445 B1
(45) Date of Patent: May 1, 2001

(54) ACTINIC RADIATION SOURCE AND USES THEREFOR

(75) Inventors: Armand P. Neukermans, Palo Alto; Timothy G. Slater, San Francisco, both of CA (US)

(73) Assignee: AIT, Torrance, CA (US)

( * ) Notice: Subject to any disclaimer, the term of this patent is extended or adjusted under 35 U.S.C. 154(b) by 0 days.

(21) Appl. No.: 09/615,006

(22) Filed: Jul. 12, 2000

Related U.S. Application Data

(62) Division of application No. 08/872,697, filed on Jun. 11, 1997, now Pat. No. 6,140,755.
(60) Provisional application No. 60/019,636, filed on Jun. 12, 1996.

(51) Int. Cl.[7] .................................................. B32B 31/24
(52) U.S. Cl. .................................. 445/1; 216/27; 216/79
(58) Field of Search .................................. 445/1; 216/27, 216/67, 79

(56) References Cited

U.S. PATENT DOCUMENTS

| | | |
|---|---|---|
| 3,211,927 | 10/1965 | Hester et al. . |
| 3,607,680 | 9/1971 | Uno et al. . |
| 3,611,418 | 10/1971 | Uno et al. . |
| 3,742,230 | 6/1973 | Spears et al. . |
| 3,788,892 | 1/1974 | Van Raalte et al. . |
| 3,815,094 | 6/1974 | Smith . |
| 3,971,860 | 7/1976 | Broers et al. . |
| 4,455,561 | 6/1984 | Boyden . |
| 4,468,282 | 8/1984 | Neukermans . |
| 4,494,036 | 1/1985 | Neukermans . |
| 4,966,663 | * 10/1990 | Mauger ............................ 204/129.3 |
| 5,509,046 | 4/1996 | Logan . |
| 5,612,588 | 3/1997 | Wakalopulos . |
| 5,637,880 | 6/1997 | Horino . |

FOREIGN PATENT DOCUMENTS

| | | |
|---|---|---|
| 0 367 750 | 3/1989 | (EP) . |
| 2 711 680 | 10/1994 | (FR) . |
| 1 519 493 | 12/1974 | (GB) . |
| WO94/28573 | 5/1993 | (WO) . |
| WO96/03767 | 7/1995 | (WO) . |
| WO96/27044 | 2/1996 | (WO) . |
| WO96/21238 | 6/1996 | (WO) . |

* cited by examiner

*Primary Examiner*—Kenneth J. Ramsey
(74) *Attorney, Agent, or Firm*—Donald E. Schreiber

(57) ABSTRACT

An actinic radiation source (20) includes an anode (36) upon which an electron beam from a cathode ray gun (24) impinges. The anode (36) includes a window area (52) formed by a silicon membrane. The electron beam upon striking the anode (36) permeates the window area (52) to penetrate into medium surrounding actinic radiation source (20). A method for making an anode (36) uses a substrate having both a thin first layer (44) and a thicker second layer (46) of single crystal silicon material between which is interposed a layer of etch stop material (48). The second layer (46) is anisotropically etched to the etch stop material (48) to define the electron beam window area (52) on the first layer (44). That portion of the etch stop layer (48) exposed by etching through, the second layer (46) is then removed. The anode (36) thus fabricated has a thin, monolithic, low-stress and defect-free silicon membrane electron beam window area (52) provided by the first layer of the substrate.

12 Claims, 10 Drawing Sheets

FIG._2
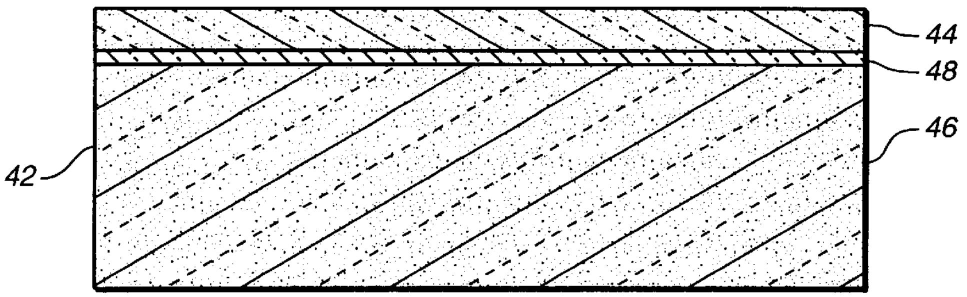
FIG._3A
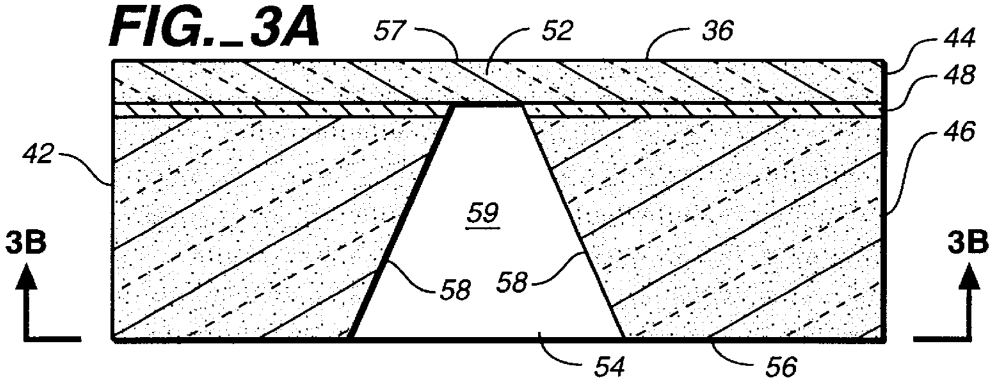
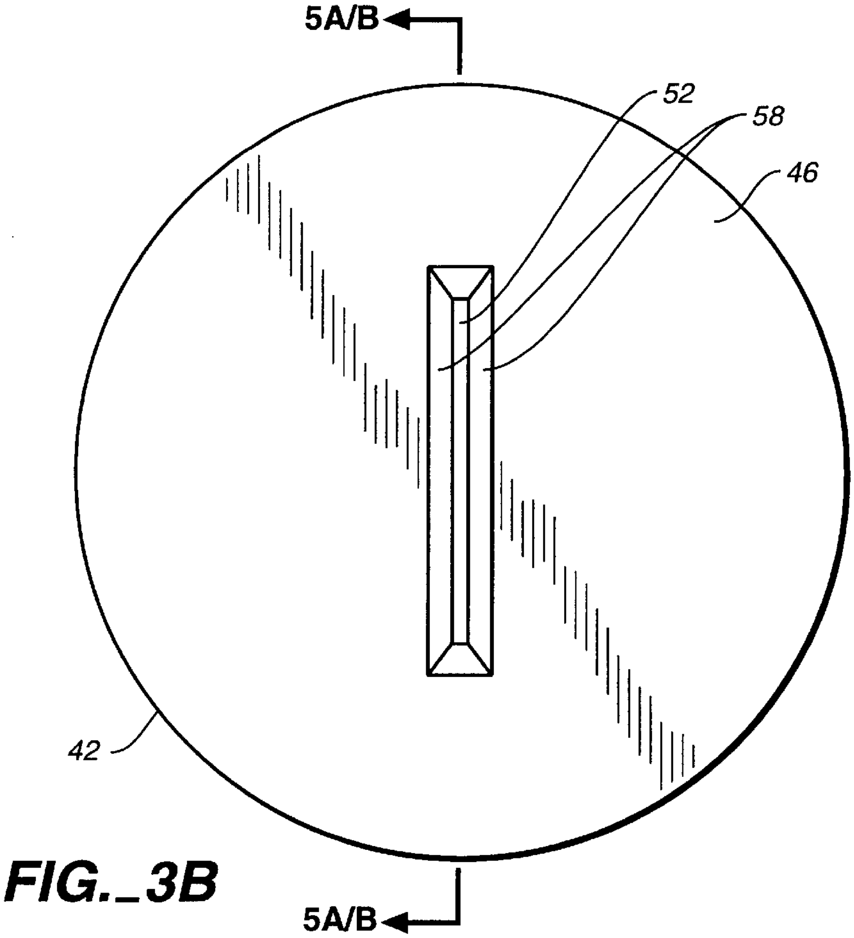
FIG._3B

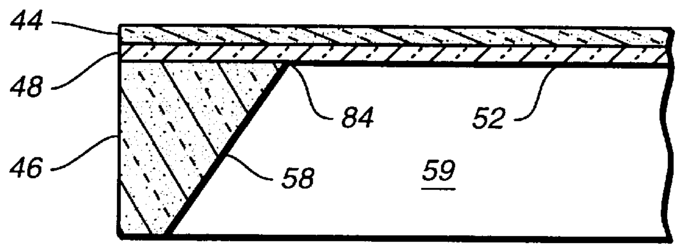
FIG._7
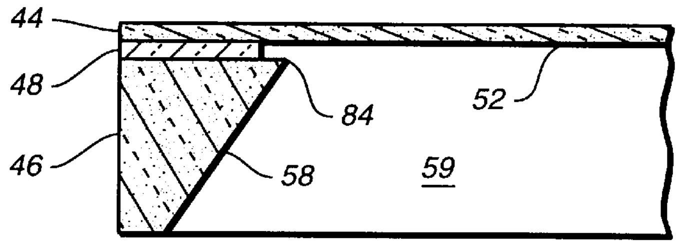
FIG._8
FIG._10
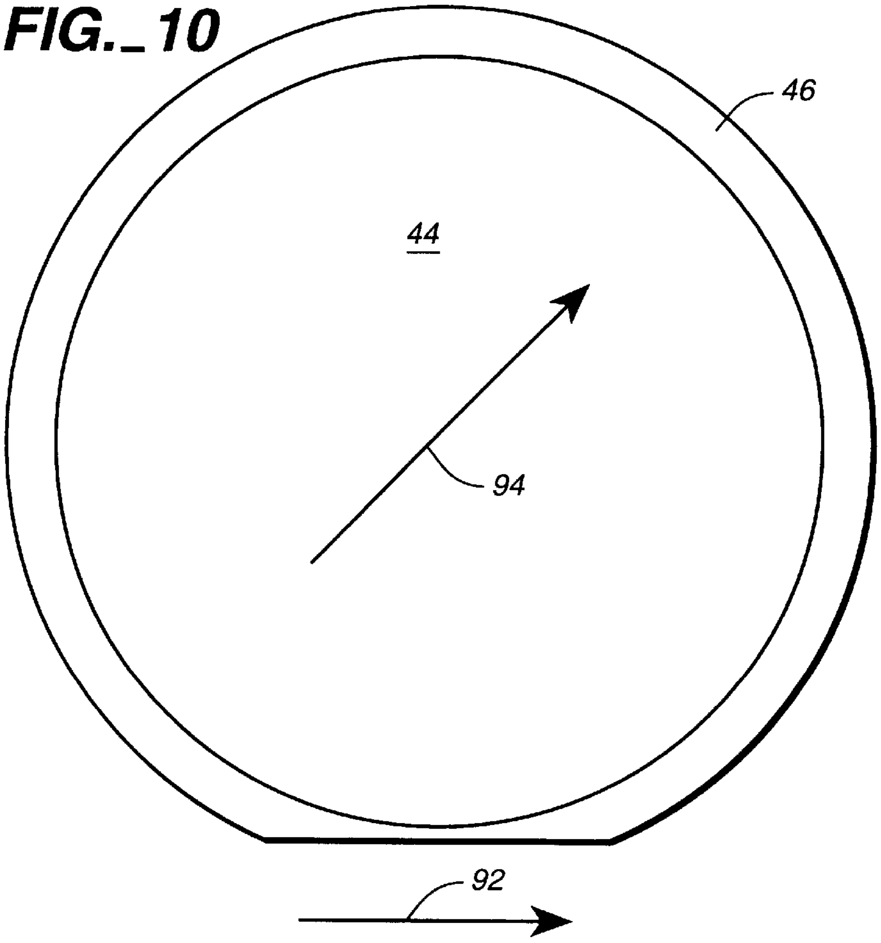

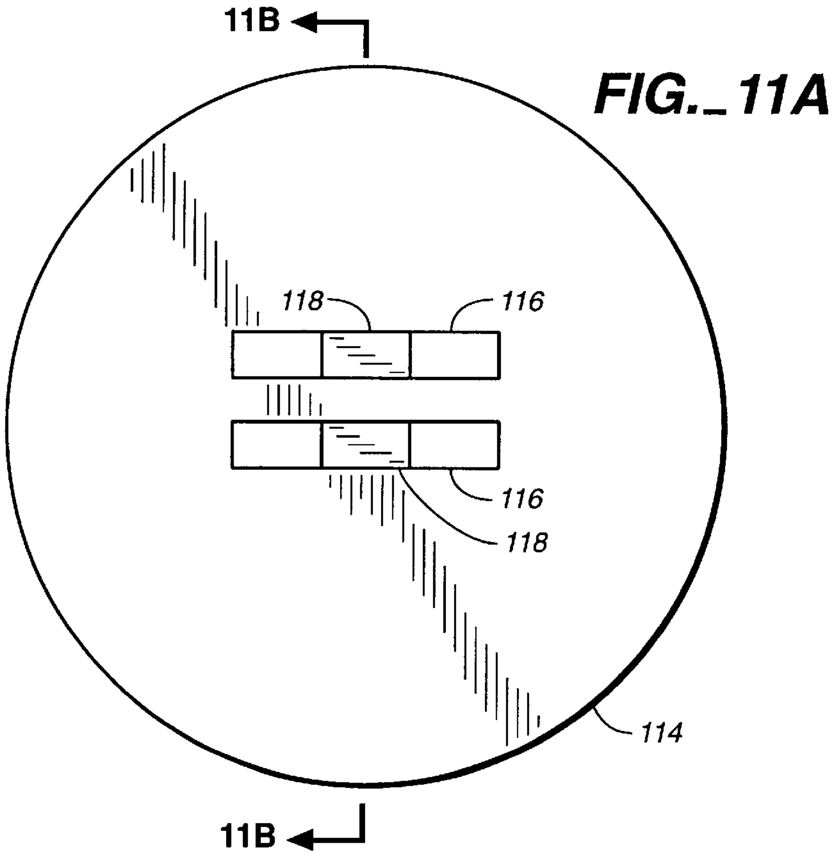
FIG._11A
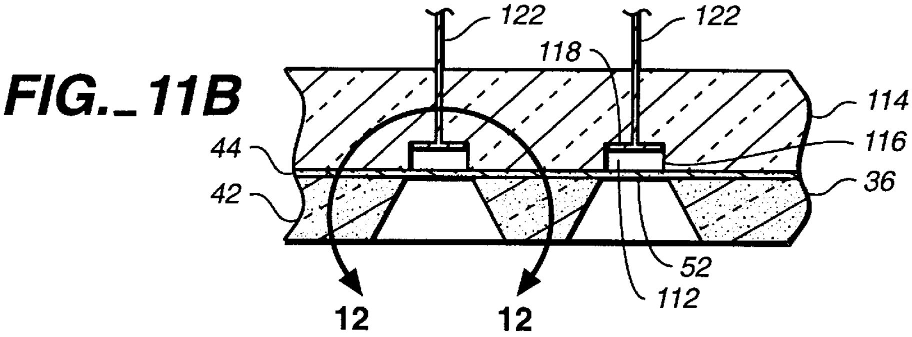
FIG._11B
FIG._12
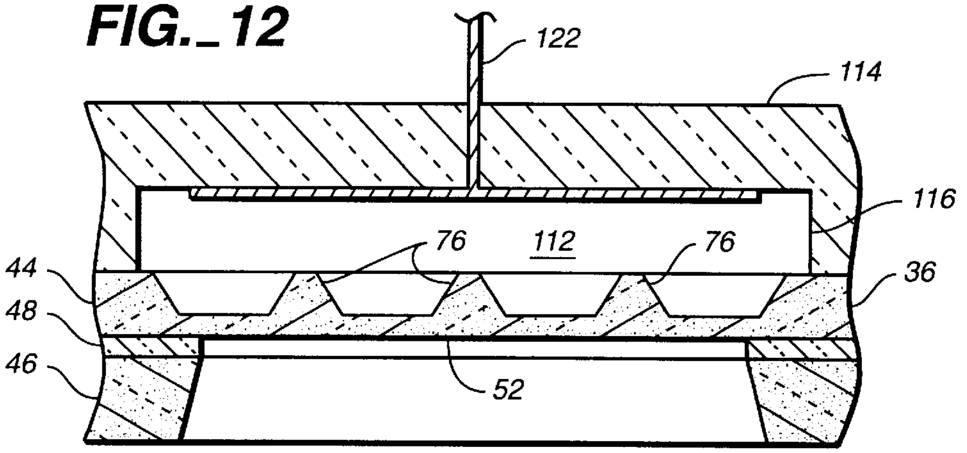

ACTINIC RADIATION SOURCE AND USES THEREFOR

CLAIM OF PROVISIONAL APPLICATION RIGHTS

This is a division of application Ser. No. 08/872,697 filed Jun. 11, 1997, now U.S. Pat. No. 6,140,755, which parent patent application claimed the benefit of U.S. Provisional Patent Application Ser. No. 60/019,636 filed on Jun. 12, 1996.

BACKGROUND OF THE INVENTION

1. Field of the Invention

The present invention relates generally to devices for producing actinic radiation, and more particularly to devices for producing actinic radiation wherein an electron beam, originating in a vacuum, pierces a thin membrane window to then penetrate into medium present on a non-vacuum environment side of the window.

2. Description of the Prior Art

Actinic radiation is used widely for promoting or inducing chemical reactions in various circumstances such as polymerization, cross-linking, sterilization, grafting etc. Actinic radiation for such purposes can be created by emitting electrons from a cathode ray gun located at one end of a cathode ray tube ("CRT") structure, accelerating the emitted electrons through a vacuum present within the CRT structure, and then directing the electrons onto a very thin anode of a window area Electrons impinging upon the thin anode pass through the window to then produce actinic radiation upon striking atoms and/or molecules in a medium surrounding the CRT structure. Actinic radiation created by such electron beam impingement can either directly or indirectly catalyze chemical reactions which are very difficult to induce by any other means. Because of the nature of the actinic radiation produced by an electron beam impinging into a medium and because the very high power densities obtainable with an electron beam, producing actinic radiation in this way provides a very energetic source of radiation at a cost substantially less than other sources providing comparable performance.

U.S. Pat. No. 4,468,282 entitled "Method of Making an Electron Beam Window," that issued Aug. 28, 1984, on an application filed by one of the applicants herein ("the '282 patent"), describes making a membrane window for such a CRT structure by first depositing a thin film of a refractory material having a low atomic number onto a substrate, and then etching away a portion of the substrate leaving only the thin film. Specifically, the '282 patent discloses depositing a thin film of silicon carbide ("SiC"), boron nitride ("BN"), boron carbide ("$B_4C$") silicon nitride ("$Si_3N_4$") or aluminum carbide ("$Al_4C_3$") ranging from less than a micron to several microns thick using chemical vapor deposition ("CVD"). The '282 patent further discloses that such a thin film is deposited onto a silicon wafer substrate having a (100) orientation, or onto a suitably selected polycrystalline substrate possibly made from tungsten, molybdenum or silicon. A thin membrane window made in this way from any of the materials listed above is readily permeable to electrons having an energy of 10 to 30 kilo electron volts ("kev"), is inert, pinhole free, has high mechanical strength, and, if deposited under appropriate conditions, has minimal residual stress. A film used for the membrane window, although only a few microns thick, must be vacuum tight and mechanically very strong to withstand atmospheric pressure, while concurrently experiencing thermal stress and heating associated with passage on an electron beam through the film.

A difficulty experienced in fabricating the thin membrane windows disclosed in the '282 patent is that it is difficult to grow a perfect film of most of the suitable materials. Consequently, a significant probability exists that a thin film prepared in accordance with the '282 patent will have approximately one defect square centimeter ("$cm^2$") defect. Such defects weaken the membrane and a single weak point may be sufficient to destroy an electron-beam window, particularly under the high load imposed upon the film due to the difference between atmospheric pressure on one side of the window and vacuum on the other side. Moreover, defects in the thin film may grow or propagate under the combined influences of electron-beam irradiation, heating of the very thin membrane due to impingement upon and passage of the electron beam through the film, and the very high mechanical stress applied by the pressure difference across the window. All the preceding factors cause defects in a membrane to grow which eventually results in catastrophic failure of the film.

Furthermore, several of the thin film materials identified in the '282 patent such as BN and $Si_3N_4$ are insulators which is undesirable for various reasons. For example, it has been observed in x-ray lithography that BN and $Si_3N_4$ thin films rapidly develop defects upon exposure to electron-beam or x-ray radiation as indicated by the appearance of color centers in the film. Moreover, over time films made from BN and $Si_3N_4$ rapidly experience plastic deformation as cumulative electron-beam irradiation increases.

A suitable material for making thin film windows not disclosed or described in the '282 patent is silicon. Silicon has a sufficiently low atomic number so an electron beam will pass through a silicon window, and also has a thermal conductivity that is adequate to permit dissipating energy deposited in the window by passage of the electron beam. Furthermore, a silicon membrane window will not suffer damage by the electron-beam irradiation unless the incident electron-beam energy is 125 keV or greater, an energy level that is far higher than what is usually needed to produce actinic radiation. However, thin film membrane windows made from silicon are useful for this application only if they can be made defect free and of any required thickness.

The methods usually employed to make very thin silicon membranes exploit effects produced by doping pure silicon material. In the most common method for producing thin silicon membranes, silicon is highly doped with boron and then etched with ethylene diamine. However, a thin silicon membrane produced in this way has high internal stress. The stress in such a thin silicon membrane can be reduced if the film is also doped with germanium. However, even with germanium doping the thin silicon membrane exhibits a high dislocation density. Furthermore, the etchant used to make thin silicon membranes in this way, ethylene diamine, is highly carcinogenic and toxic in many other ways.

Alternative methods for making thin silicon membranes rely on electrochemical etching using an appropriate electrical bias so that etching stops at a junction between p-type and n-type silicon material. Small quantities of thin silicon membranes may be made by electro-chemical etching, but the method is unsuitable for large scale production of membranes. The very heavy doping of the silicon material required to form the junction between p-type and n-type silicon introduces numerous dislocations which reduces the strength of the resulting films. When heated and simultaneously subjected to large mechanical stresses such as those experienced by an electron-beam window, dislocations in the membrane may congregate to form fissures which eventually cause in a catastrophic failure of the membrane.

SUMMARY OF THE INVENTION

An object of the present invention is to provide an improved thin membrane window that permits an electron beam, originating in a vacuum, to penetrate into medium present on a non-vacuum environment side of the window.

Another object of the present invention is to provide a defect free thin membrane window that permits an electron beam, originating in a vacuum, to penetrate into medium present on a non-vacuum environment side of the window.

Another object of the present invention is to provide a reliable thin membrane window that permits an electron beam, originating in a vacuum, to penetrate into medium present on a non-vacuum environment side of the window.

Another object of the present invention is to provide a durable thin membrane window that permits an electron beam, originating in a vacuum, to penetrate into medium present on a non-vacuum environment side of the window.

Another object of the present invention is to provide an economically practical thin membrane window that permits an electron beam, originating in a vacuum, to penetrate into medium present on a non-vacuum environment side of the window.

Another object of the present invention is to provide an easily manufactured thin membrane window that permits an electron beam, originating in a vacuum, to penetrate into medium present on a non-vacuum environment side of the window.

Yet another object of the present invention is to provide a source of actinic radiation that is simple, durable and reliable.

Yet a further object of the present invention is to provide a source of actinic radiation that is easy and economical to manufacture.

Another object of the present invention is to identify additional new uses for the actinic radiation source.

Briefly, an actinic radiation source in accordance with the present invention includes an evacuated cathode ray tube structure having a first end to which is joined a cathode ray gun. The cathode ray gun is adapted for emitting an electron beam into the evacuated cathode ray tube structure. Joined to a second end of the cathode ray tube structure separated from the first end and the cathode ray gun is an anode upon which the electron beam impinges. The anode includes a window area formed by a thin, monolithic, low-stress and defect-free silicon membrane. The window area is oriented with respect to the cathode ray tube structure so the electron beam emitted by the cathode ray gun upon being accelerated through vacuum present within the cathode ray tube structure and striking the anode permeates the window area to penetrate into medium surrounding the cathode ray tube structure.

The present invention also includes a method for making an anode adapted for use in the actinic radiation source. A preferred substrate for fabricating the anode includes a first layer of single crystal silicon material and a second layer of single crystal silicon material between which is interposed a layer of etch stop material. A patterned etchant resisting layer is formed, on a surface of the second layer furthest from the etch stop material, and a protective etchant resisting layer is formed on a, surface of the first layer furthest from the etch stop material. The second layer is then anisotropically etched to the etch stop material interposed between the first layer and the second layer. Etching of the second layer defines the electron beam window area on the first layer of the substrate. After the window area has been defined, that portion of the etch stop material exposed by etching through the second layer of the substrate is removed. In this way an anode is fabricated that has a thin, monolithic, low-stress and defect-free silicon membrane electron beam window area provided by the first layer of the substrate. The anode thus fabricated may then be bonded to a face plate that is, in turn, joined to the cathode ray tube structure of the actinic radiation source.

These and other features, objects and advantages will be understood or apparent to those of ordinary skill in the art from the following detailed description of the preferred embodiment as illustrated in the various drawing figures.

BRIEF DESCRIPTION OF THE DRAWINGS

FIG. 2 is a cross-sectional view depicting a silicon-on-insulator ("SOI") wafer which may be used advantageously for forming an anode in accordance with the present invention having a thin, electron transmissive window area;

FIG. 3*a* is a cross-sectional view depicting forming an electron-beam permeable window area in the SOI wafer depicted in FIG. 2;

FIG. 3*b* is a plan view of the electron-beam permeable window area formed in the SOI wafer aligned with a [110] crystallographic axis of a silicon layer that is taken along a line 3*b*—3*b* in FIG. 3*a;*

FIG. 7 is a cross-sectional view of the SOI wafer during formation an electron-beam permeable window area before removal of an etch stop layer within the SOI wafer;

FIG. 8 is a cross-sectional view of the SOI wafer after formation an electron-beam permeable window area and after removal of an etch stop layer within the SOI wafer by overetching;

FIG. 10 is a plan view depicting two silicon wafers oriented for bonding with differing crystallographic axes aligned;

FIG. 11*a* is a plan view of a plate adapted to be bonded to the anode of the actinic radiation source to establish cells for holding sample material during evaluation of the material's carcinogenic or electron-attachment properties;

FIG. 11*b* is a cross-sectional view of the anode with the plate depicted in FIG. 11*a* bonded thereto taken along a line 11*b*—11*b* in FIG. 11*a* showing cells for holding sample material during evaluation of the material's carcinogenic or electron-attachment properties;

FIG. 12 is an enlarged cross-sectional view of the bonded anode and plate taken along a line 12—12 in FIG. 11*b* illustrating in greater detail reinforcing ribs within a cell for holding sample material;

DETAILED DESCRIPTION OF THE PREFERRED EMBODIMENT

Figure 1:
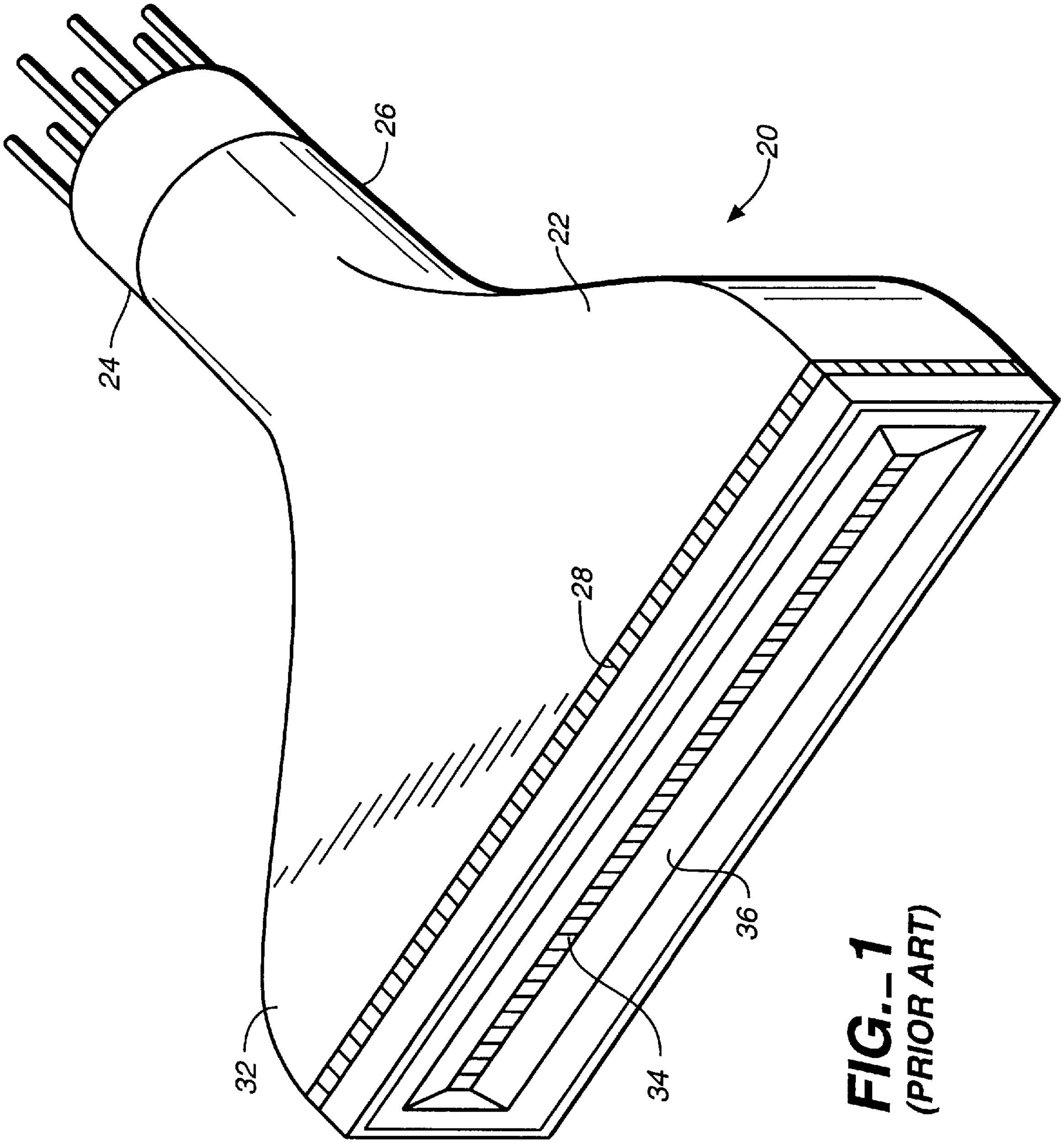
FIG. 1 (PRIOR ART)
FIG. 1 is a perspective illustration of an actinic radiation source of the prior art including a thin film window area made from a refractory material.

FIG. 1 illustrates an actinic radiation source in accordance with the prior art as described in the '282 patent that is referred to by the general reference character 20. The disclosure of the '282 patent is hereby incorporated by reference as though fully set forth here. The actinic radiation source 20 includes an evacuated cathode ray tube structure 22 which has a cathode ray gun 24 joined at one end 26. During operation of the actinic radiation source 20, the cathode ray gun 24 emits an electron beam into the vacuum within the cathode ray tube structure 22. The actinic radiation source 20 also includes a face plate 28 that is joined to the cathode ray tube structure 22 at an end 32 which is separated from the cathode ray gun 24. As disclosed in the '282 patent, the prior art face plate 28 includes a window area 34 of an anode 36 that is formed by a thin film membrane of a refractory material such as SiC, BN, $B_4C$, $Si_3N_4$, or $Al_4C_3$ that has a low atomic number.

FIG. 2 illustrates a silicon-on-insulator ("SOI") wafer 42, that may be fabricated by a wafer bonding or Simox process, and that is used in fabricating anode 36 for an actinic radiation source 20 in accordance with the present invention. The SOI wafer 42 has a first upper layer 44 of single crystal silicon material and a second lower layer 46 also of single crystal silicon material. Both the upper layer 44 and the lower layer 46 are usually (100) oriented layers of single crystal silicon material. A silicon dioxide etch stop layer 48 is interposed between and joins the upper layer 44 to the lower layer 46. Substrates such as the SOI wafer 42 can be made by bonding two oxidized single crystal (100) oriented silicon wafers together at high temperature. After two such wafers have been bonded together, one of the wafers now forming the upper layer 44 is thinned down to a desired thickness by carefully lapping the SOI wafer 42 formed by the thermal bonding process. For fabricating a anode 36 for the face plate 28, the upper layer 44 may be a few to 10.0 microns thick, and may be separated from the lower layer 46 by a few thousand angstrom thick etch stop layer 48.

A SOI structure suitable for fabricating the anode 36 may also be produced by the Simox process in which oxygen is implanted at very high concentrations into a single crystal silicon wafer, the wafer is then annealed, and the upper layer 44 is then usually grown epitaxially to a desired thickness. Regardless of how the SOI wafer 42 is produced, the net result is to provide a SOI wafer 42 for fabricating the anode 36 that has a defect-free single crystal silicon upper layer 44 that is dislocation-free and low-stress, that has a very well controlled thickness, and that is separated from the lower layer 46 by the etch stop layer 48.

Referring now to FIGS. 3*a* and 3*b,* producing an electron-beam permeable window area 52 in the SOI wafer 42 for the anode 36 simply requires forming both a suitably patterned opening 54 in a thin silicon dioxide etchant resisting layer 56 covering most of the lower layer 46 furthest from the etch stop layer 48, and a protective silicon dioxide etchant resisting layer 57 covering all of the upper layer 44 farthest from the etch stop layer 48. After forming the layers 56 and 57, the SOI wafer 42 is immersed in KOH to anisotropically etch a channel 59 through the lower layer 46 of the SOI wafer 42. The structure resulting from the KOH etching process is that depicted in the cross-sectional view of FIG. 3*a*. In the illustration of FIG. 3*a,* sloping side walls 58 of the channel 59 are formed by [111] planes of the lower layer 46. Etching of the lower layer 46 stops at the etch stop layer 48 so there is no etching of the upper layer 44. After the lower layer 46 has been etched, the etch stop layer 48 may then be removed by dipping the SOI wafer 42 into a buffered HF solution, as is known in the art.

Figure 6A:
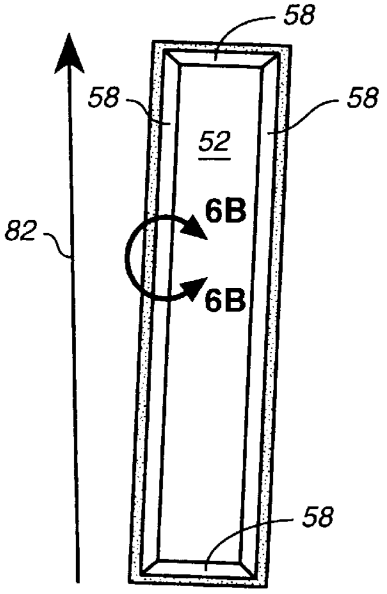
FIG. 6*a* is a plan view depicting a slight misalignment between crystallographic axes of the SOI wafer depicted in FIGS. 2, 3*a* and 3*b;*
Figure 6B:
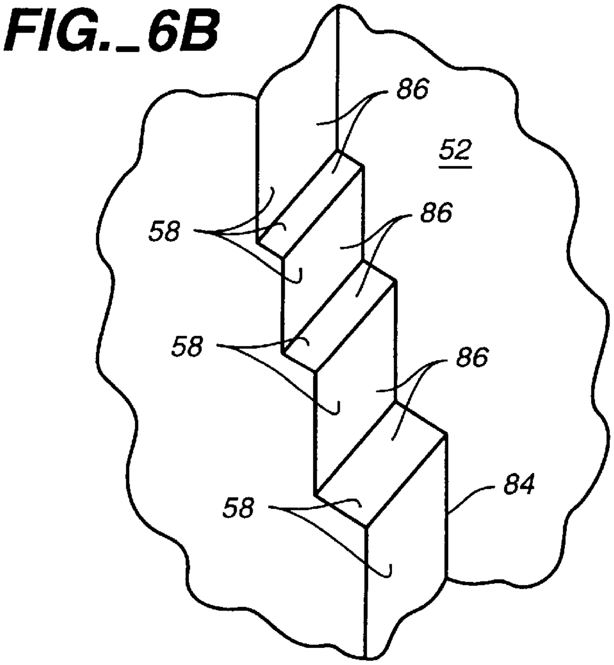
FIG. 6*b* is an enlarged plan view depicting a slight misalignment between crystallographic axes of the SOI wafer taken within the area 6*b* of FIG. 6*a;*

Fracture stress values for thin silicon membranes determined. experimentally are significantly lower than fracture stress values determined for bulk silicon wafers. It appears that the lower fracture stress values arise from stress concentrations around the membrane's periphery. As illustrated in FIGS. 6*a* and 6*b,* a slight misalignment between the [110] crystallographic axis of the lower layer 46 of the SOI wafer 42, indicated by an arrow 82 in FIG. 6*a,* and the mask used in forming the opening 54 in the etchant resisting layer 56 can produce stress concentrations. Generally, the angular orientation of the [110] crystallographic axis of a silicon wafer is accurate to approximately 1.0°. FIG. 6*a* illustrates a slight mis-orientation of the opening 54 in the layer 56 with respect to the true [110] crystallographic orientation of the lower layer 46 of the SOI wafer 42. As illustrated in the enlargement in FIG. 6*b*, during etching, the etch front advancing along the side walls 58 attempts to align with the [110] crystallographic orientation. At the membrane window area 52, edges 84 of the side walls 58 consist of a series of microscopic discontinuities 86. Only perfect alignment between the opening 54 and [110] crystallographic axis of the lower layer 46 can prevent formation of the discontinuities 86. Upon exposing the thin membrane window area 52 to stress, sharp corners in the edges 84 of the side walls 58 illustrated in FIGS. 6*b* and 7 act to concentrate stress at particular locations on the membrane window area 52 thereby lowering the fracture stress value measured for the membrane window area 52.

Fabricating the thin membrane window area 52 using the method described above offers an opportunity for eliminating stress; concentrations at the edges 84 because the etch stop layer 48 separates the lower layer 46 having the edges 84 from the upper layer 44. As illustrated in FIG. 8, over etching the etch stop layer 48 during its removal in the buffered HF solution smooths the outline of the discontinuities 86 and the membrane window area 52, while also concurrently selectively decoupling the lower layer 46 from the upper layer 44. Thus, overetching the etch stop layer 48 during its removal lessens stress concentrations in the window area 52 of the upper layer 44.

To further lessen the stress concentrations in the window area 52, after forming the side walls 58 and before removing the etch stop layer 48 from the window area 52, the SOI wafer 42 may be exposed to an isotropic etchant which tends to smooth the discontinuities 86. For example, an etchant consisting of 8 parts concentrated nitric acid ("$HNO_3$") and 1 part concentrated hydrofluoric acid ("HF") agitated at room temperature etches silicon at about 15 microns per minute while etching a silicon dioxide etch stop layer 48 at about 2000 angstroms per minute, or less.

An alternative to using a silicon-on-insulator wafer is the well-known electrochemical etch stop technique. In this method, a lightly doped n-type layer, e.g. $1–5\times10^{15}$ boron atoms per cubic centimeter ("atoms/$cm^3$"), is grown epitaxially on a p-type substrate wafer, e.g. $1–5\times10^{14}$ phosphorus atoms/$cm^3$. By applying a voltage to the n-layer during etching, it is possible to etch the p-type layer through to the pn junction without etching the n-type layer. This method can be used to make n-type membranes window areas 52 of precisely determined thickness.

As a less expensive alternative to using the SOI wafer 42 having the etch stop layer 48, a plain silicon wafer substrate can be time etched from one side to form the membrane window area 52 having the desired thickness. It has been found experimentally that a timed etch in a temperature controlled bath containing 25–40% KOH in water, or other suitable etchant such as TMAH, can be used effectively to form cavities 400 microns deep with a uniformity of ∓2 micron over an entire wafer's surface. Performing such a sequence of timed etchings and measuring the thickness of the window area 52 after each etching can produce a membrane having characteristics suitable for the window area 52. If a timed etch is used for forming the membrane window area 52 in a substrate, then there is no need to remove the etch stop layer 48 as described above because it does not cover the window area 52.

Figure 4A:
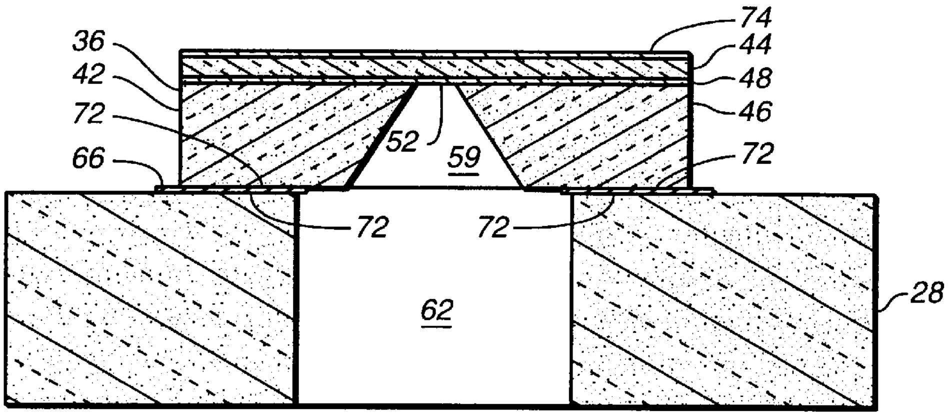
FIG. 4*a* is a cross-sectional view illustrating bonding the SOI wafer, having formed therein the electron-beam permeable window area that is aligned with a [110] crystallographic axis of a silicon layer, to a face plate for the actinic radiation source.
Figure 4B:
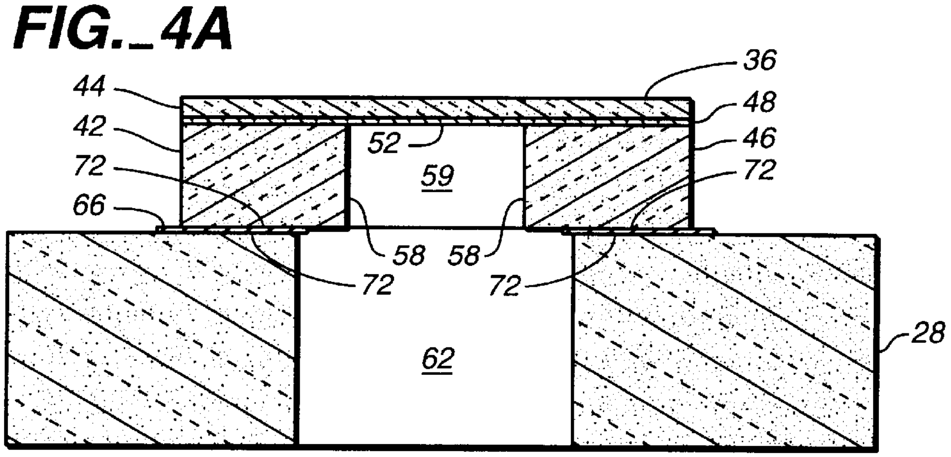
FIG. 4*b* is a cross-sectional view illustrating bonding the SOI wafer, having formed therein the electron-beam permeable window area that is aligned with a [100] crystallographic axis of a silicon layer, to a face plate for the actinic radiation source.

The thin, monolithic, low-stress and defect-free silicon membrane electron-beam permeable window area 52 of the upper layer 44 may be a couple of microns thick (or may range from 0.3 to 5.0 microns) depending upon the energy of impinging electrons. As depicted in the plan view of FIG. 3*b*, the window area 52 may be approximately 1.0 inch long, and 0.2 to 5.0 mm wide. The window area 52 may be oriented parallel to the [110] crystallographic direction of the lower layer 46 which results in side walls 58 having an angle of 54° as depicted in FIG. 3*a* and 4*a*. Alternatively, as depicted in FIG. 4*b* the window area 52 may be oriented parallel to the [100] crystallographic direction which results in vertical side walls 58 as contrasted with the sloping side walls 58 depicted in FIGS. 3*a* and 4*a*.

Membranes made this way are ideal for the electron-beam permeable window area 52 because they are made from low-stress, defect-free and dislocation-free single crystal silicon material. Therefore, the window area 52 has excellent mechanical and thermal properties. Since the window area 52 can be fabricated by etching with KOH which does not etch an etch stop layer 48 of silicon dioxide, the manufacturing process is very simple. Control of the thickness of the window area 52 and its uniformity is straightforward, and is established during fabrication of the SOI wafer 42, and not during etching of the lower layer 46. The fact that both the lower layer 46 and the upper layer 44 are single crystal silicon material having the same crystallographic orientation and the same thermal expansion is very helpful. For example, because of these properties a subsequent bonding process for joining the anode 36 to the face plate 28 that heats the SOI wafer 42 to a relative high temperature does not stretch the membrane forming the window area 52.

Being entirely made out of silicon, as stated previously the membrane window area 52 suffers no damage from electron-beam irradiation unless the electron energy is well above 125 keV. However, crystallographic dislocations can still occur at high temperatures and high stresses. Therefore, the operating temperature of the window area 52 should be kept as low as practicable. The membrane window area 52 is electrically conductive. Consequently, the window area 52 does not become electrically charged during bombardment by the electron beam.

Assembling the Face Plate 28

The SOI wafer 42 including the window area 52 may be readily bonded to a silicon or polycrystalline silicon substrate forming the face plate 28 depicted in FIG. 1. A single crystal silicon or polycrystalline silicon substrate, ⅛" to ¼" thick, may be used for the face plate 28 of the actinic radiation source 20. As depicted in FIG. 4, a slit 62 pierces the face plate 28 which permits the electron beam's striking the window area 52 thereby providing the anode 36 of the actinic radiation source 20. The SOI wafer 42 including the window area 52 of the present invention may be joined to the face plate 28 by bonding the lower layer 46 to the face plate 28. Again with this combination of materials for the SOI wafer 42 and for the face plate 28, it is possible to obtain matched bonds, since both the SOI wafer 42 and the face plate 28 have the same coefficient of expansion. Therefore, all parts forming the face plate 28 of the actinic radiation source 20 in accordance with the present invention expand and cool uniformly, and the membrane window area 52 does not experience any undue stress.

To produce a vacuum tight bond between the face plate 28 and the lower layer 46 of the SOI wafer 42, a thin foil 66 that is approximately 1.5 to 2.0 mil thick made of pure aluminum that is shaped or etched into a suitable preform is placed between the face plate 28 and the SOI wafer 42, a weight is then placed on the upper layer 44 of the SOI wafer 42, and the sandwich thus assembled heated in vacuum, or in a nitrogen or argon atmosphere, for a few minutes to a temperature slightly above the eutectic temperature of silicon-aluminum (about 550° C.), and then cooled. Because pure aluminum and silicon inter-diffuse aggressively, bonds can be achieved at temperatures as low as 450° C. In general, it is advantageous to bond the SOI wafer 42 to the face plate 28 at as low a temperature as practicable for forming a good bond. Alternatively, the foil 66 may be made from an aluminum-silicon ("Al—Si") material. However, the affinity of silicon for Al—Si is somewhat less than silicon's affinity for pure aluminum, and bonding the SOI wafer 42 to the face plate 28 requires reaching the temperature at which the Al—Si eutectic forms. In bonding the SOI wafer 42 to the face plate 28, the orientation of the SOI wafer 42 may be reversed so the upper layer 44, rather than the lower layer 46, is juxtaposed with and bonded to the face plate 28.

Generally, better results can be obtained in bonding the SOI wafer 42 to the face plate 28 if a 1.0 to 3.0 micron thick coating 72 of aluminum is first evaporated onto surfaces of the SOI wafer 42 and the face plate 28 that are to be juxtaposed and bonded together. In applying the coating 72 to the lower layer 46 of the SOI wafer 42, a suitable mask should be used so aluminum does not coat the window area 52. Often, if the juxtaposed surfaces of the SOI wafer 42 and face plate 28 are sufficiently flat, the foil 66 of aluminum is unnecessary. In such instances, the SOI wafer 42 and the face plate 28 can be simply pressed together and heated. As an alternative to aluminum, a foil 66 made from gold or gold-germanium may be used in bonding the SOI wafer 42 to the face plate 28. The use of a foil 66 made from gold or gold-germanium only requires a temperature of approximately 450° C. for bonding the SOI wafer 42 to the face plate 28. Alternatively, coatings 72 of titanium, rather than aluminum, evaporated onto the SOI wafer 42 and onto the face plate 28 may be used in bonding the SOI wafer 42 to the face plate 28.

Metallic bonding of the SOI wafer 42 to the face plate 28 such as that described above establishes electrical continuity between the SOI wafer 42 and the face plate 28. Alternatively silicon-to-silicon bonding processes can be used. For example, Quener, et al. describe forming silicon-to-silicon bond at a temperature of 450° C. using glasses spun onto the surfaces to be bonded (9th Workshop on MEMS Systems, IEEE, 1996, p. 272). However, such non-metallic bonding processes may result in unreliable electrical continuity between the SOI wafer 42 and the face plate 28.

Often it is advantageous to coat the window area 52 with an oxidation resistant material. After etching through the lower layer 46, one way of providing oxidation resistance illustrated in FIG. 4*a* is to form a thin coating 74 of SiC on the surface of the window area 52 to be located furthest from the face plate 28. A SiC coating can be formed on the upper layer 44 and/or the lower layer 46 by heating the SOI wafer 42 in a carbon containing medium, as described in U.S. Pat. No. 5,393,647 entitled "Method of Making Superhard Tips for Micro-Probe Microscopy and Field Emission" ("the '647 patent). The '647 patent is hereby incorporated by reference. Heating the SOI wafer 42 in a carbonaceous atmosphere converts unprotected outer silicon material of the SOI wafer 42 into a much more oxidation resistant SiC layer several hundred angstroms thick. In this way a SiC coating may be simply and easily formed on both surfaces of the SOI wafer 42 furthest from the etch stop layer 48. The temperature for forming SiC in this way (750–850° C.) does not damage the membrane forming the window area 52. The thin SiC coating does not impede aluminum bonding of the SOI wafer 42 to the face plate 28. The thickness of the SiC coating may be controlled by the temperature and the reaction time during which the silicon material of the SOI wafer 42 is exposed to the carbonaceous medium. If the SiC coating is not desired on a surface of the SOI wafer 42 to be juxtaposed with the face plate 28, the silicon dioxide layers 56 or 57 may be left on the SOI wafer 42. Leaving the silicon dioxide layers 56 or 57 prevents any SiC formation on the silicon dioxide coated surface of the SOI wafer 42. After growing the SiC coating onto the SOI wafer 42, the silicon dioxide layer may then be removed.

Figure 5A:
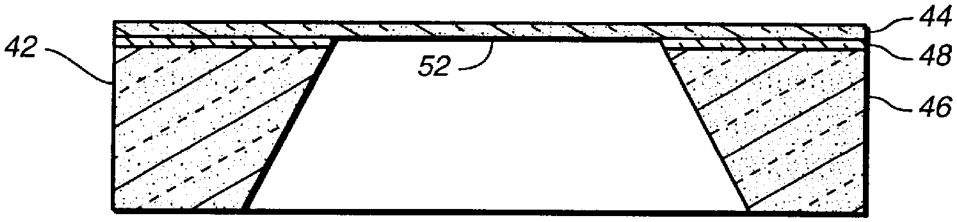
FIG. 5*a* is a cross-sectional view depicting a membrane window area that is too thick to be penetrated effectively by an electron beam having the desired energy taken along a line 5*a*/5*b*—5*a*/5*b* in FIG. 3*b;*

In addition to providing a membrane window area 52 having a very uniform and well defined thickness, as illustrated in FIGS. 5*a* through 5*d* it is also possible to fabricate an elongated, thin membrane window area 52 having almost all of its area penetrable by an electron beam with an energy of 10 to 30 keV. FIG. 5*a* depicts a membrane window area 52 formed using the process described above that is too thick to permit effective penetration by an electron beam having the desired energy. For example, a membrane window area 52 that is 10 micron thick. However, the surface of the upper layer 44 furthest from the lower layer 46 can then be covered with a etchant resisting layer that is patterned at the window area 52 together with providing other surfaces of the SOI wafer 42 with etchant resisting layers, and the excessively thick window area 52 etched to thin most of the window area 52 making it permeable to the electron beam. Note that the patterned etchant resisting layer leaves un-etched ribs 76 that mechanically reinforce the window area 52.

Figure 5B:
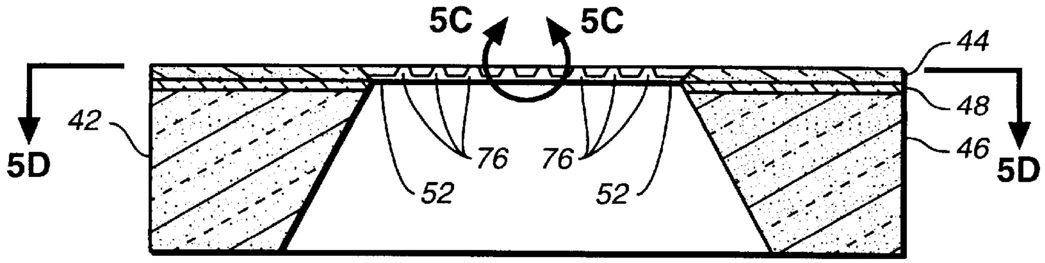
FIG. 5*b* is a cross-sectional view depicting the membrane window area depicted in FIG. 5*a* after most of the membrane window area has been thinned to permit penetration by an electron beam except at locations along the length of the window area where transverse reinforcing ribs remain after thinning of the window area.

Thinning of the window area 52 in this way to form the ribs 76 may be performed using a timed etch in KOH maintained at a well controlled temperature or using reactive ion etching ("RIE"). Because the etching does not need to penetrate very deeply into the window area 52, and because the upper layer 44 of the SOI wafer 42 has a well defined and uniform thickness, the resultant thinning of the window area 52 can be accurately controlled, e.g. to $\mp 0.1$ microns. In the illustration of FIG. 5*b*, the window area 52 is thinned to as little as a few thousand angstroms, but more typically is 1.0 to 2.0 microns.

Figure 5C:
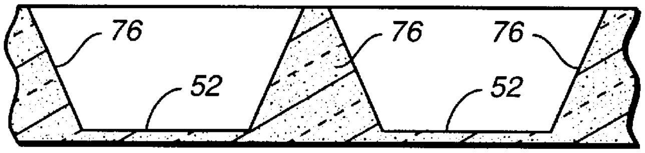
FIG. 5*c* is a cross-sectional view taken along a line 5*c*—5*c* in FIG. 5*b* which provides an enlarged illustration of the reinforcing ribs.
Figure 5D:
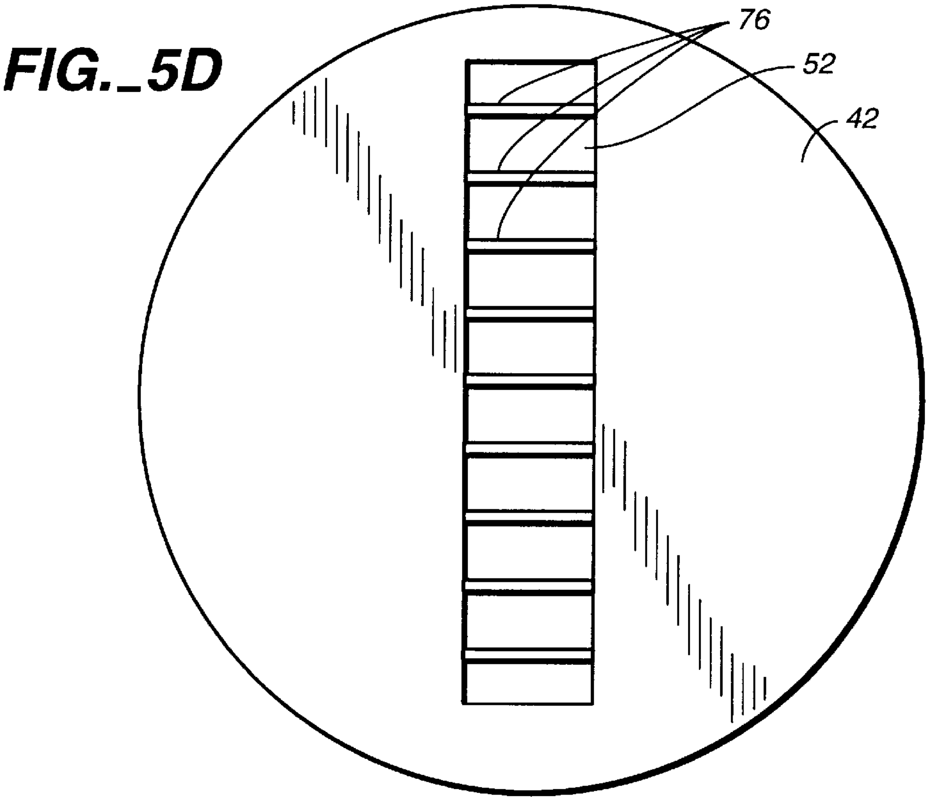
FIG. 5*d* is a plan view taken along a line 5*d*—5*d* in FIG. 5*b*, depicting the window area and the reinforcing ribs.

As depicted in the enlargement of FIG. 5*c*, the ribs 76 in the example posited above are 10 microns thick. Therefore, the ribs 76 are 1000 times stronger than a 1 micron thick beam of the same width. As depicted in FIG. 5*d*, the ribs 76 typically extend across the width of the window area 52, i.e. transversely to the length of the window area 52, and therefore have a length from a fraction of a mm to a few mm long that equals the width of the window area 52. The electron-beam permeable areas of the window area 52 may span 90 microns between immediately adjacent pairs of ribs 76. Hence the effective electron permeable areas of the window area 52 may be as much as 90% of the total window area 52. The ribs 76 increase approximately 100 times the strength of the window area 52, while the total electron permeable area remains close to 90% of the window area 52. Moreover, the ribs 76 also enhance both thermal and electrical conductivity between the window area 52 and the remainder of the anode 36. Consequently, use of the ribs 76 permits fabricating both a strong and comparatively thin window area 52. As described above, the window area 52 may be oriented along either the [110] or [100] crystallographic axes of the SOI wafer 42.

Figure 9A:
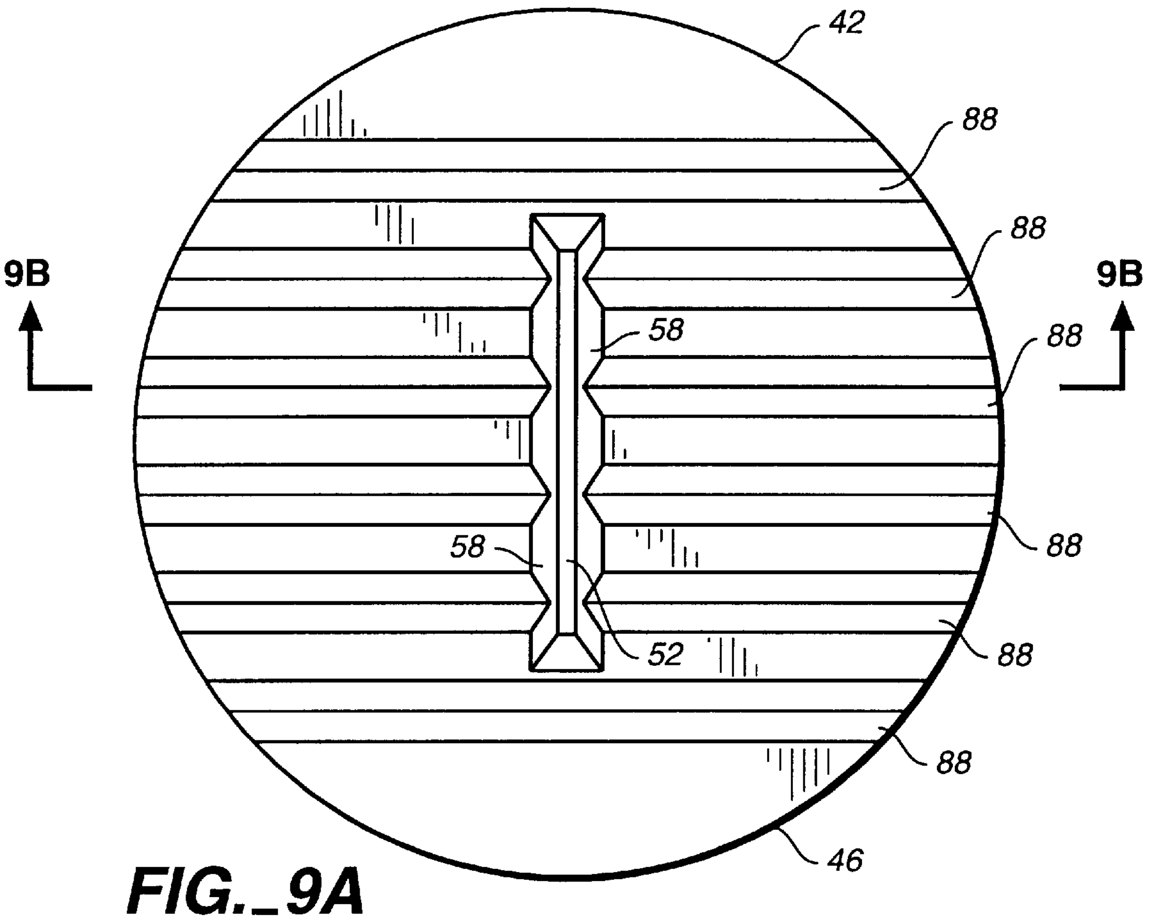
FIG. 9*a* is a plan view of the electron-beam permeable window area similar to the illustration depicted in FIG. 3*a* further illustrating grooves for cooling gas formed across a surface of the SOI wafer that are oriented transversely to the window area.
Figure 9B:
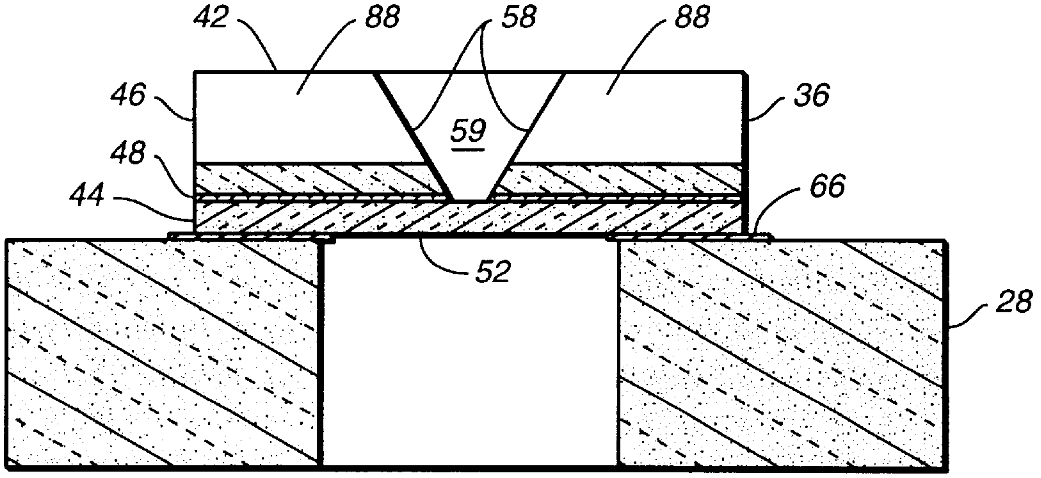
FIG. 9*b* is a cross-sectional view of the window area taken along the line 9*b*—9*b* of FIG. 9*a* depicting bonding of the SOI wafer having grooves for cooling gas formed therein to a face plate for the actinic radiation source as depicted in FIG. 4.

FIGS. 9*a* depicts a plurality of V-shaped grooves 88 for cooling gas formed into the lower layer 46 of the SOI wafer 42 that are oriented transversely to the window area 52 of the anode 36. As illustrated in FIG. 9*b*, bonding the upper layer 44 of the SOI wafer 42 to the face plate 28 disposes the grooves 88 in contact with medium surrounding the actinic radiation source 20. Oriented in this way, the grooves 88 provide channels along which cooling gas may be blown to chill the window area 52 during operation of the actinic radiation source 20.

It is possible to arrange the bonded Sol wafer 42 even more advantageously for fabricating the anode 36 than described thus far. As illustrated in FIG. 10, a [100] crystallographic axis 92 of the upper layer 44 and a [100] crystallographic axis 94 of the lower layer 46 need not be aligned parallel to each other. Rather, the crystallographic axes 92 and 94 of two (100) oriented silicon wafers may be rotated with respect to each other. As illustrated in FIG. 10, during bonding the crystallographic axis 92 of the silicon wafer forming the lower layer 46 may be oriented at 45° with respect to the crystallographic axis 94 of the silicon wafer forming the upper layer 44. Orienting the crystallographic axes 92 and 94 of two silicon wafers at 45° with respect to each other causes the [110] crystallographic direction of one wafer to coincide with the [100] crystallographic direction of the other wafer. This allows etching along the [110] direction in one silicon wafer to coincide with the [100] direction in the other silicon wafer. Because single crystal silicon tends to cleave along the [110] crystallographic axis, arranging the crystallographic axes of the upper layer 44 and the lower layer 46 so the side walls 58 are aligned parallel to the [100] crystallographic axis of the upper layer 44 reduces the propensity for fracture of the window area 52.

Furthermore, the silicon wafers being bonded together may themselves have differing crystallographic orientations, and this may be arranged to have several advantages. For example, if the upper layer 44 has a (111) wafer orientation rather than a (100) wafer orientation while the lower layer 46 has a (100) wafer orientation, then the upper layer 44 becomes virtually impervious to etching in KOH. Under such circumstances, small pinholes in the protective silicon dioxide etchant resisting layer 57 and/or the etch stop layer 48 do not produce pits in the upper layer 44 during KOH etching because the upper layer 44 itself inherently resists etching by KOH. Consequently, the yield and reliability of window areas 52 fabricated using such a SOI wafer 42 is inherently very high. Moreover, the small differences in the coefficient of thermal expansion along various crystallographic axes in such a bonded SOI wafer 42 can also be exploited advantageously to produce or relieve tension in the membrane window area 52 during operation of the actinic radiation source 20, if so desired.

Specific Uses for the Actinic Radiation Source 20

In addition to the use for the prior art actinic radiation source 20 identified in the '282 patent, i.e. thermal ink jet printing, the actinic radiation source 20 appears useful for various other applications. For example the actinic radiation source 20 appears useful for applying a theory of Bakale for detecting or characterizing carcinogenic or electron-attachment materials. (See G. Bakale, et al., *Quasifree Electron Attachment to Carcinogens in Liquid Cyclohexane,* Cancer Biochem. Biophys., 1981, Vol. 5, pp. 103–109, and G. Bakale, et al., *A Pulse-Radiolysis Technique for screening Carcinogens,* 188th National Meeting of the American Chemical Society, Philadelphia, August 26–31). In this application, the actinic radiation source 20 replaces a large Van Der Graaf Generator or pulsed flash x-ray tube.

As depicted in FIGS. 11*a* and 11*b,* cells 112 a few mm wide and at most only a few hundred microns thick for holding a sample of the material being tested are integrated directly into the window area 52 of the anode 36. To establish the cells 112, an electrically insulating substrate 114, e.g. glass or silicon with appropriate insulation formed thereon, has formed into a surface thereof one or more troughs 116. An electrode 118 is deposited at the bottom of each of the troughs 116 and is provided with an electrical lead 122 for connecting the electrode 118 to an electronic circuit external to the actinic radiation source 20 and the cells 112. The electrodes 118 extend only along a portion of the length of each of the cells 112 on both sides of the midpoint of the cells 112. After forming the troughs 116 and the electrodes 118, the substrate 114 is bonded to the upper layer 44 of the SOI wafer 42 thereby enclosing cells 112 over each of the window areas 52 in the anode 36. Care must be exercised in bonding the substrate 114 to the SOI wafer 42 to insure that the electrodes 118 remain electrically insulated from the window area 52.

Configured in this way, the electron beam sweeps across each cell 112 at very high speed to produce a sheet of injected charge which drifts across the cell 112 under the influence of an electric field applied between the electrode 118 and the anode 36. For the reasons set forth in greater detail below, the energy of electrons injected into a sample can be quite low, as low as 20–30 keV. Operating at this low electron energy, electron penetration into the sample can be made negligible compared to the electron drift length across the cell 112.

A solvent liquid for carrying the sample may be iso-octane as described by Bakale. For an electric field gradient across the electrode 118 between the electrode 118 and the anode 36 of 10,000 volts-per-centimeter ("V/cm"), the drift velocity is $10^5$ centimeters-per-second ("cm/sec"). Hence for a 1.0 mm thick cell 112 and an applied voltage of 1,000 volts ("V"), the drift time of the electrons is 1.0 microsecond. A suitable time for the electron beam to inject charge into the sample should be no more than 1/10 this value, i.e. 100 nanoseconds. If the cell 112 is 1 mm wide along the direction of electron beam scanning, then a sweep velocity for the electron beam of $10^4$ meters-per-second ("m/sec") yields a 100 nanosecond interval during which electrons are injected into the sample. The beam may be swept across the window area 52 either magnetically or electrostatically. If the beam is swept an order of magnitude faster than $10^4$ meters-per-second m/sec, which is an achievable velocity, then the thickness of the cell 112 and the voltage applied across the anode 36 and the electrode 118 may both be reduced by almost an order of magnitude.

For a 1.0 microamper ("$\mu$A") beam current, the electron charge injected into the sample during a 100 nanosecond interval is 0.1 picocoulomb. After electron multiplication in the sample liquid, assuming a multiplication of 3000 for each 30 keV electron injected into the sample, the drifting charge is approximately 300 picocoulomb. This amount of charge is very easily detected during the time interval under consideration, i.e. 1.0 microsecond, with a standard charge sensitive amplifier as used in nuclear instrumentation. Differentiation of the charge signal produces the current, whose absorption yield the desired electron capture data.

In measuring electron capture by the sample, the silicon membrane forming the anode 36 is used as a ground electrode and a positive voltage is applied to the electrode 118 to attract the electrons injected into the sample together with the drifting charge created by the injected electrons. This arrangement produces a very clean electrical signal, virtually without any ion current. If so desired, the electrical polarity applied to the electrode 118 may be reversed to observe the ion decay.

As depicted in FIGS. 11*a* and 11*b*, two separate cells 112 may be arranged side-by-side in the path of the electron beam. The sample liquid in both of the cells 112 directly contacts the membrane window area 52. One of the cells 112 may be used as a reference cell 112 to hold only the solvent but not any material being tested for its carcinogenic or electron-attachment properties. This reference cell 112 is located along side the sample cell and receives electron beam irradiation. The sample and/or reference liquids may flow through the cells 112. If the sample and/or reference liquids flow through the cells 112, then injection of electrons may be repeated periodically without ever depleting the sample.

The anode 36 including the membrane window area 52 may be made as illustrated in FIG. 12. By using a relatively thick upper layer 44, e.g. 10–20 micron thick, the membrane window area 52 may include ribs 76 similar to the ribs 76 illustrated in FIGS. 5*b*–5*d*. Similar to the depicted in FIGS. 5*b*–5*d*, the ribs 76 depicted in FIG. 12 are formed by etching the upper layer 44 of the SOI wafer 42. The membrane may be only 1.0 micron thick. But the ribs 76 will be 1000 times stronger, being ten times thicker than the membrane window area 52. Hence even if ribs 76 occupy only 10% of the width of the membrane window area 52, the ribs 76 increase membrane strength 100 times. The ribs 76 do not apprecia-bly affect the electric field applied across the cell 112. Use of the actinic radiation source 20 to measure electron capture has many advantages over the previous implementation which generates charge throughout the volume of a cell holding the sample material.

Figure 14:
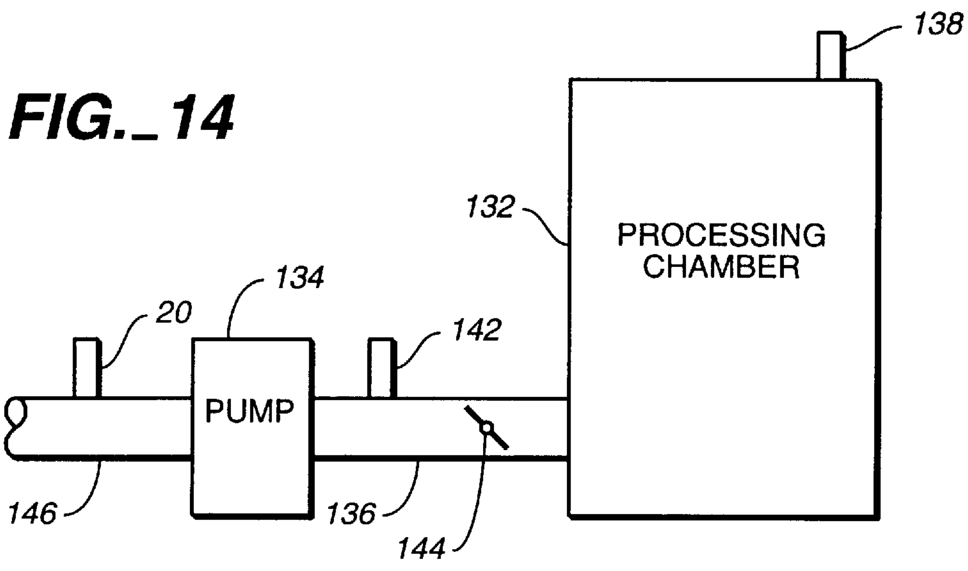
FIG. 14 is a diagrammatic illustration depicting a vacuum processing chamber that includes the actinic radiation source for decomposing reactive chemicals in effluent processing gas.

Another application for the actinic radiation source 20 is decomposing reactive chemicals in effluent from vacuum processing chambers used for etching and deposition as in the semiconductor manufacturing industry. FIG. 14 depicts a processing chamber 132 that is evacuated by a pump 134. The pump 134 is coupled to the processing chamber 132 by a vacuum manifold 136. A process-gas inlet-port 138 admits a controlled flow of process gas into the processing chamber 132. To impede backstreaming of effluent into the processing chamber 132, a ballast-gas inlet-port 142 on the vacuum manifold 136 admits a flow of ballast gas into the vacuum manifold 136 downstream from a throttling valve 144.

Many gases in effluent from vacuum processing chambers will capture electrons. Such materials will therefore be decomposed into more basic compounds which are less corrosive or reactive upon irradiation by electrons emitted through the anode 36 of the actinic radiation source 20. In this application, the actinic radiation source 20 is located outside the processing chamber 132. While the actinic radiation source 20 may be located in the vacuum manifold 136, it is preferably located entirely outside the vacuum environment in an exhaust manifold 146 of the pump 134 thereby preventing backstreaming of decomposition products into the processing chamber 132.

Figure 13A:
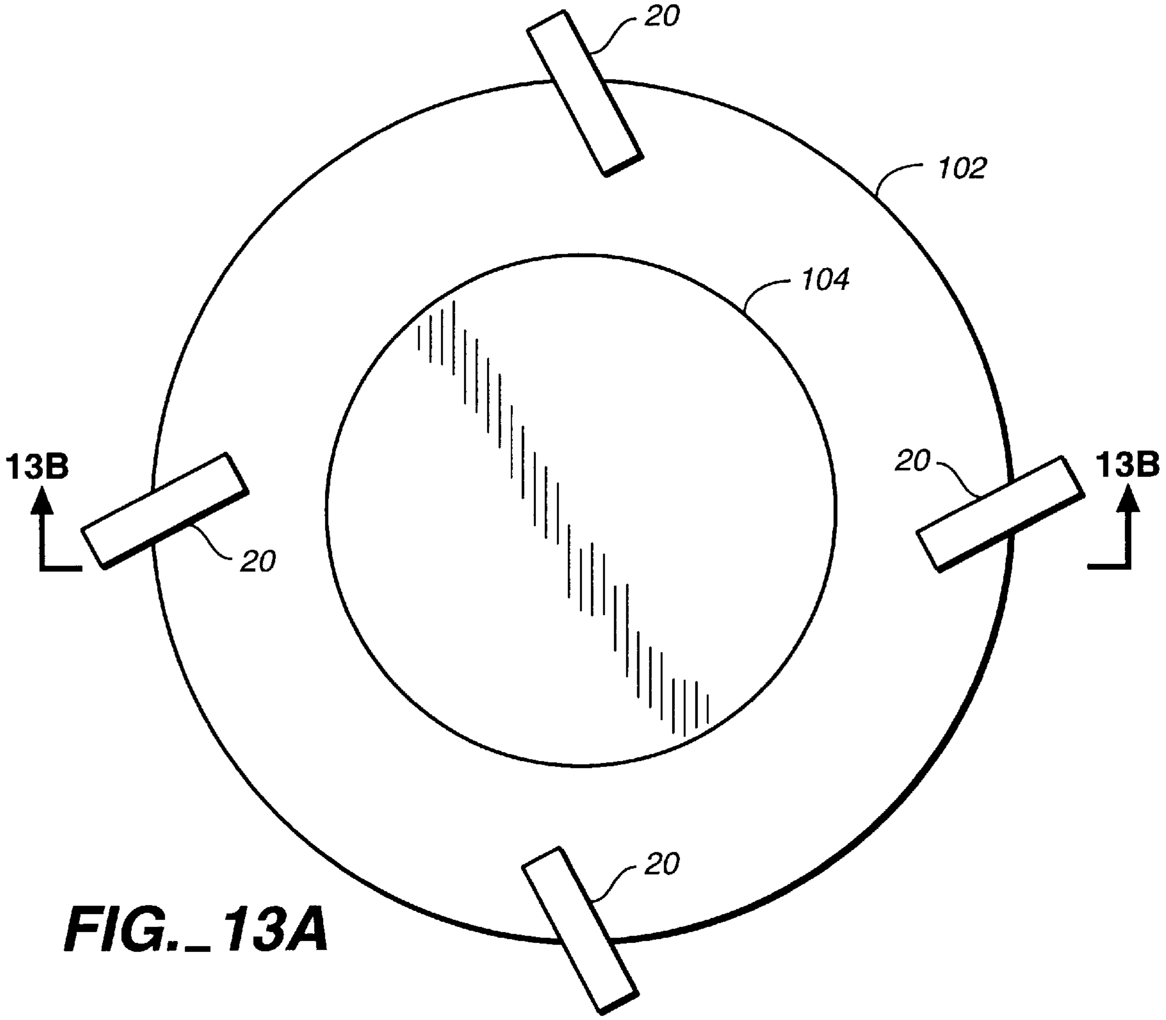
FIG. 13*a* is a plan view of a low pressure sputtering chamber employing actinic radiation sources in accordance with the present invention to ionize gas present within the sputtering chamber.
Figure 13B:
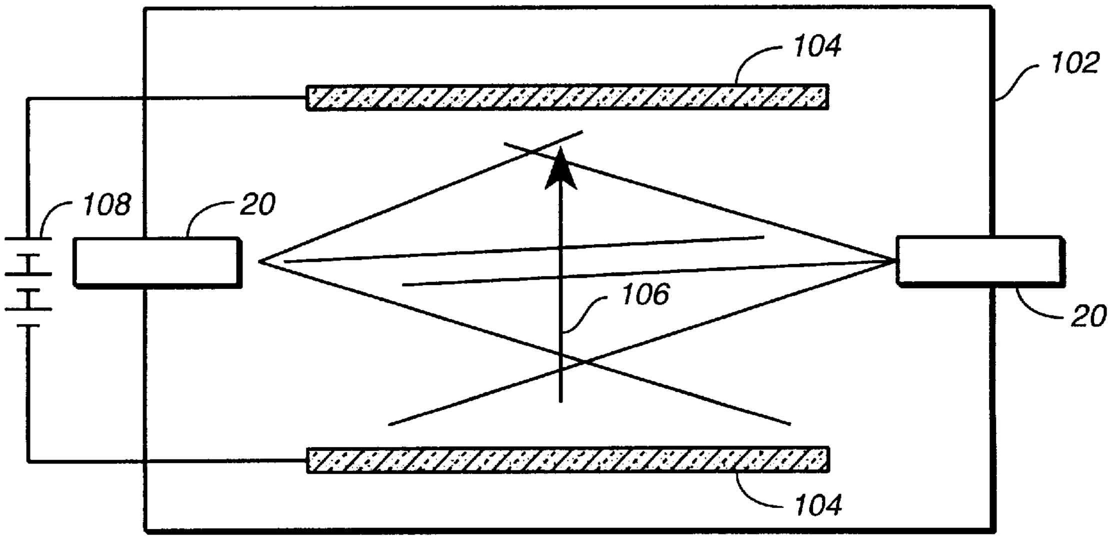
FIG. 13*b* is a cross-sectional view of the low pressure sputtering chamber taken along the line 13*b*—13*b* in FIG. 13*a;*

Yet another application for the actinic radiation source 20 is providing ionization for low pressure sputtering. The actinic radiation source 20 can be used advantageously in low pressure sputtering because of the difficulty generally experienced in starting and maintaining ionization. FIGS. 13*a* and 13*b* depict a cylindrically shaped sputtering chamber 102 that uses a plurality of actinic radiation sources 20 in accordance with the present invention for producing ionizing radiation within the sputtering chamber 102. The sputtering chamber 102 employs a plurality of the actinic radiation sources 20 arrayed around the periphery of a pair of parallel, circular, plate-shaped sputtering electrodes 104. The actinic radiation sources 20 inject electrons tangentially between the sputtering electrodes 104 as illustrated to increase the ionization and the ionization uniformity between the sputtering electrodes 104. A bias magnet field of approximately fifty (50) oersteds, indicated by an arrow 106 in FIG. 13*b*, that is directed perpendicularly to the sputtering electrodes 104 causes electrons injected between the sputtering electrodes 104 to circulate within the volume of gas between the sputtering electrodes 104.

Each of the actinic radiation sources 20 may have multiple window areas 52 to increase the electron beam current injected into the sputtering chamber 102. The electron beams may either be scanned along the window areas 52, or be focused into one or more lines along the window areas 52. Deflection fields for controlling electron beam position on the window areas 52 may be applied from outside the sputtering chamber 102. Because the actinic radiation sources 20 are completely shielded within the sputtering chamber 102, the outside of the sputtering chamber 102 appears to be at an electrical ground potential. If the actinic radiation sources 20 are integrated into the walls of the sputtering chamber 102 as illustrated in FIGS. 13*a* and 13*b*, then an electric potential between the sputtering electrodes 104, supplied illustratively by a battery 108 depicted in FIG. 13*b*, is virtually undisturbed.

Because in low pressure sputtering the path of electrons is very long, all electron energy is effectively dissipated in ion collisions. The high energy electrons permeating the window areas 52 can produce a very large sustained ionization, even at low pressure. For example, every electron permeating through the window areas 52 with an initial energy of 30 keV may be multiplied a thousand fold. Because high energy electrons permeate through the window areas 52, their trajectories are influenced very little by the transverse sputtering field between the sputtering electrodes 104. Consequently, the electrons emitted from the actinic radiation sources 20 travel a significant distance along their trajectory thereby providing uniform ionization throughout most of the sputtering chamber 102. The energy of electrons emitted from the actinic radiation sources 20 can be adjusted as required for gas pressure, etc. within the sputtering chamber 102. The efficiency and uniformity of ionization within the sputtering chamber 102 may be observed visually by light emitted within the volume between the sputtering electrodes 104 upon removing the transverse electrostatic sputtering field.

The sputtering chamber 102 may be constructed to provide a slightly higher gas pressure immediately adjacent to the window areas 52. Under such circumstances, the sputtering gas becomes highly ionized because it comes into immediate contact with the window areas 52 on the actinic radiation sources 20. The highly ionized sputtering gas thus obtained then diffuses to produce the desired degree of ionization everywhere throughout the sputtering chamber 102.

Figure 15A:
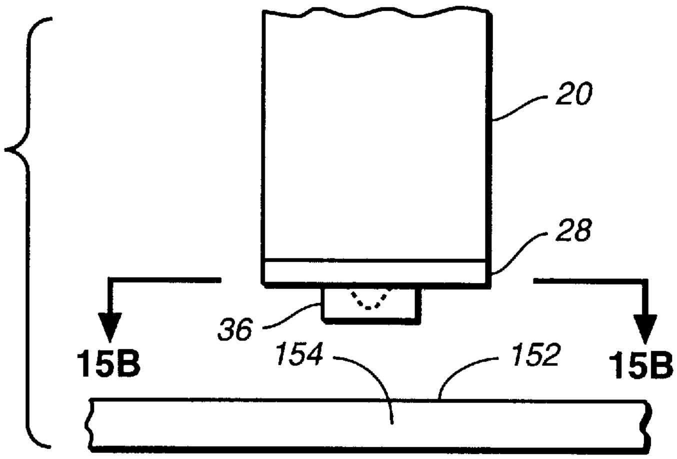
FIG. 15*a* is an elevational view of a rapid prototyping system employing the actinic radiation source for exposing electron-sensitive materials.
Figure 15B:
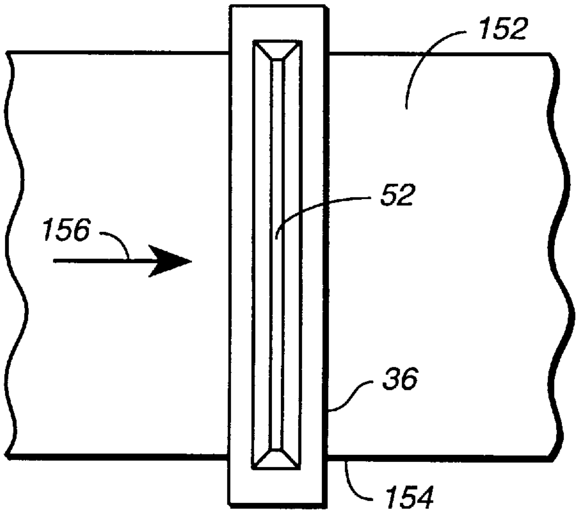
FIG. 15*b* is plan view of the rapid prototyping system taken along the line 15*b*—15*b* of FIG. 15*a;*

Another application for the actinic radiation source 20 is rapid prototyping from CAD designs. Rather than using ultraviolet radiation for exposing a pattern in a resist material, as illustrated in FIGS. 15*a* and 15*b* the electron beam permeating through the anode 36 of the actinic radiation source 20 directly exposes a pattern in a sheet or layer of electron-sensitive material 152. The electron-sensitive material 152 may form part of a workpiece 154. During irradiation of the electron-sensitive material 152, the electron beam is modulated as it sweeps along the window area 52 of the anode 36. To obtain good resolution in the electron-sensitive material 152, the actinic radiation source 20 uses a small diameter electron beam and the electron-sensitive material 152 is disposed as close as practicable to the window area 52. The electron-sensitive material 152 exposed by irradiation from the actinic radiation source 20 can produce either a positive or negative image. Because the electron beam directly irradiates the electron-sensitive material 152, the sheet or layer of electron-sensitive material 152 can be quite thick, e.g. 50 microns or more. To produce a two dimensional ("2D") shape, the workpiece 154 being patterned moves laterally past the anode 36 as indicated by an arrow 156 in FIG. 15*b*.

A further application for the actinic radiation source 20 is waterproofing materials. Recent observations establish that cotton's characteristics may be changed so it no longer absorbs water. This change is effected by exposing the cotton fiber to an electron beam while the fiber is in a fluorine medium. Upon such exposure, the cotton fibers become hydrophobic. In general, the halogens fluorine or chlorine and mixtures of chlorine and fluorine, or halocarbons or fluorocarbons such as trichloro-ethylene, $CH_3CCl_3$, $CCl_3Cf_3$ may also be used to render cotton hydrophobic.

Figure 16A:
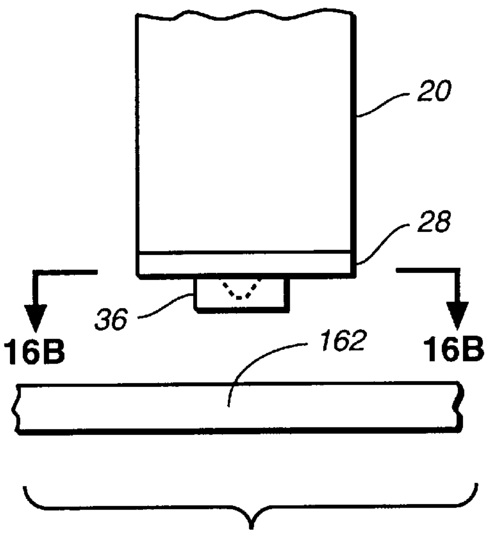
FIG. 16*a* is an elevational view of a paper waterproofing system using the actinic radiation source for irradiating a web of paper.
Figure 16B:
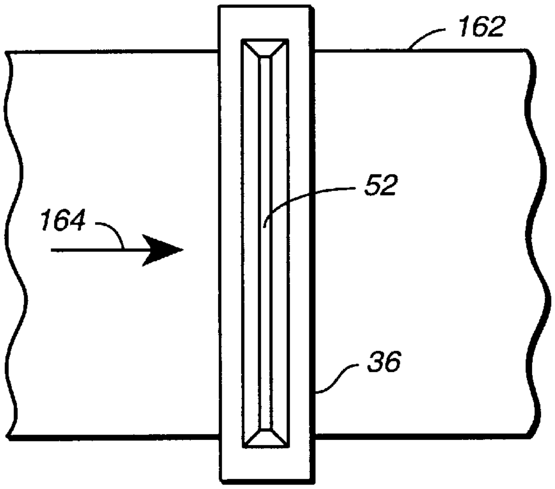
FIG. 16*b* is plan view of the paper waterproofing system taken along the line 16*b*—16*b* of FIG. 16*a;*

Paper, which is basically a cellulose fiber, is typically about 25 microns thick and highly porous. Consequently, an electron beam having an energy of approximately 30–50 keV penetrates all the way through a sheet of paper. As described above, the actinic radiation source 20 is well suited to producing an electron beam having this energy. FIGS. 16*a* and 16*b* depict the actinic radiation source 20 disposed above a web 162 of paper upon which the electron beam permeating through the window area 52 of the anode 36 impinges. The electron beam may either be scanned along the window area 52 of the anode 36, or be focused into a line along the window area 52. Concurrent with electron-beam irradiation of the web 162 of paper, the web 162 is also exposed to an atmosphere containing gases that upon irradiation will make the paper hydrophobic. The gases used to make paper hydrophobic may be fluorine, or fluorinated compounds such as $CF_4$, $SF_6$, or Freon type compounds of the type listed above. As indicated by an arrow 164 in FIG. 16*b,* during irradiation the web 162 of paper moves laterally past the anode 36. Under certain circumstances a water repellent paper may be particularly advantageous because, while it does not absorbs moisture, may still absorb special inks.

Figure 17A:
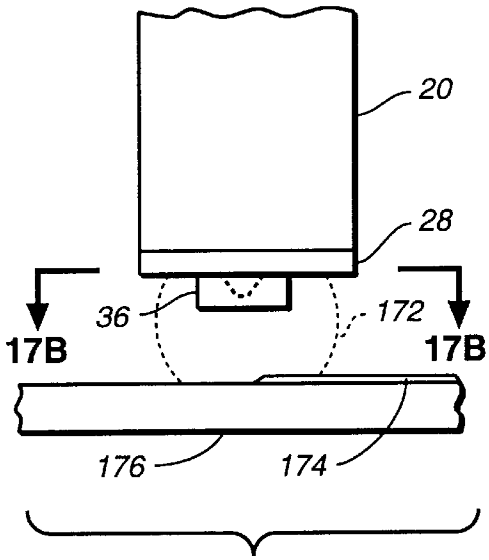
FIG. 17*a* is an elevational view of a film curing system employing the actinic radiation source for irradiating an atmosphere containing polymerizable material.
Figure 17B:
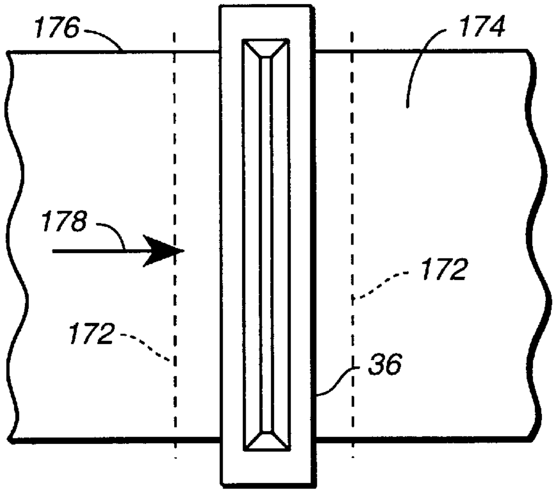
FIG. 17*b* is plan view of the film curing system taken along the line 17*b*—17*b* of FIG. 17*a.*

Yet another application for the actinic radiation source 20 is irradiating an atmosphere containing an organic material which upon irradiation cures to form a film that covers a surface of a workpiece which is exposed to the atmosphere. FIGS. 17*a* and 17*b* depict the actinic radiation source 20 with the anode 36 surrounded by an atmosphere 172, indicated by dashed lines, that includes a polymerizable organic material such as parylene. The electron beam may either be scanned along the window area 52 of the anode 36, or be focused into a line along the window area 52. Exposure of the atmosphere 172 to the electron beam permeating through the window area 52 of the anode 36 polymerizes the organic material to form a film 174 that covers a workpiece 176 then exposed to the atmosphere 172. During curing, the workpiece 176 moves past the anode 36, as indicated by an arrow 178 in FIG. 17*b,* while the film 174 is deposited onto the workpiece 176 adjacent to the anode 36. Low dielectric constant insulating films such as may be formed in this way are used in fabricating semiconductor devices such as integrated circuits.

Although the present invention has been described in terms of the presently preferred embodiment, it is to be understood that such disclosure is purely illustrative and is not to be interpreted as limiting. For example, single crystal silicon wafers other than (100) wafers can be used for the upper layer 44 and 46 forming the SOI wafer 42. Similarly, while silicon dioxide is presently preferred for the etch stop layer 48, the etch stop layer 48 may be provided by other materials such as silicon nitride, silicon oxinitride, silicon carbide, silicon carbo-nitride, or any doped silicon oxide, e.g. boron, phosphorus, antimony, arsenic, sodium, etc. Consequently, without departing from the spirit and scope of the invention, various alterations, modifications, and/or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

What is claimed is:

1. A method for making an anode adapted for inclusion in an actinic radiation source comprising the steps of:

providing a substrate having a first layer of single crystal silicon material and a second layer of single crystal silicon material between which is interposed a layer of etch stop material;

forming a patterned etchant resisting layer on a surface of the second layer furthest from the etch stop material, and a protective etchant resisting layer on a surface of the first layer furthest from the etch stop material; and etching through the second layer to the etch stop material interposed between the first layer and the second layer to thereby define a thin, monolithic and defect-free silicon membrane electron beam window area in the first layer of the substrate.

2. The method of claim 1 wherein a wafer orientation of the first layer differs from a wafer orientation of the second layer.

3. The method of claim 1 wherein the layer of etch stop material interposed between the first layer and the second layer of the substrate is formed by silicon dioxide material, and the method comprises the further step of:

removing that portion of the etch stop material exposed by etching through the second layer of the substrate.

4. The method of claim 3 wherein the etch stop material is removed by etching, and during removal of the etch stop material the etch stop material is overetched to thereby selectively decouple the second layer from the first layer and lessen stress concentrations in the window area of the first layer.

5. The method of claim 1 wherein the layer of etch stop material interposed between the first layer and the second layer of the substrate is formed by a lightly doped pn junction.

6. The method of claim 1 further comprising the steps of:

forming an etchant resisting layer on a surface of the first layer furthest from the second layer that is patterned at the window area of the first layer, and protective etchant resisting layers on other surfaces of the first layer and the second layer; and etching into the first layer to thereby define reinforcing ribs at the window area of the first layer.

7. The method of claim 1 further comprising the steps of:

providing a face plate adapted for inclusion in the actinic radiation source;

juxtaposing a surface of the substrate with a surface of the face plate; and heating the juxtaposed surfaces of the substrate and the face, plate to thereby bond together the substrate and the face plate.

8. The method of claim 7 further comprising the step of forming a plurality of grooves across the surface of the second layer furthest from the etch stop material, the grooves being oriented transverse to the window area, and wherein the surface of the first layer of the substrate is juxtaposed with and bonded to the surface of the face plate, whereby the grooves are adapted for contacting medium surrounding the actinic radiation source to facilitate cooling the window area during operation of the actinic radiation source.

9. The method of claim 7 wherein during bonding together of the substrate and the face plate a metal containing material diffuses into the juxtaposed surfaces of the substrate and the face plate.

10. The method of claim 9 wherein the metal containing material that diffuses into the juxtaposed surfaces of the substrate and the face plate is chosen from a group consisting of aluminum, aluminum-silicon, gold, gold-germanium, and titanium.

11. The method of claim 9 wherein the juxtaposed surfaces of the substrate and the face plate are coated with metal before the surfaces are juxtaposed.

12. The method of claim 1 wherein a crystallographic axis of the first layer is rotated with respect to a crystallographic axis of the second layer.

* * * * *